United States Patent
Köppel et al.

(10) Patent No.: US 7,132,610 B2
(45) Date of Patent: Nov. 7, 2006

(54) SCALE PAN MOUNT FOR SINGLE-POINT OR MULTI-POINT MOUNTED SCALE PAN

(75) Inventors: Thomas Köppel, Oetwil (CH); Peter Schilling, Siebnen (CH); Ferdinand Schneider, Winterthur (CH); Hans-Rudolph Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 133 days.

(21) Appl. No.: 11/056,717

(22) Filed: Feb. 11, 2005

(65) Prior Publication Data

US 2005/0178591 A1 Aug. 18, 2005

(30) Foreign Application Priority Data

Feb. 12, 2004 (EP) .................................. 04100538

(51) Int. Cl.
*G01G 21/18* (2006.01)
(52) U.S. Cl. .................. 177/128; 177/262; 177/253
(58) Field of Classification Search ........ 177/126–128, 177/244, 253, 262
See application file for complete search history.

(56) References Cited

U.S. PATENT DOCUMENTS

| 186,149 | A | * | 1/1877 | Montgomery | 177/262 |
|---|---|---|---|---|---|
| 4,120,371 | A | * | 10/1978 | Zohn et al. | 177/262 |
| 4,602,693 | A | * | 7/1986 | Racicot | 177/262 |
| 5,721,398 | A | | 2/1998 | Balsen et al. | 177/184 |
| 6,472,618 | B1 | | 10/2002 | Izumo et al. | 177/210 |

FOREIGN PATENT DOCUMENTS

EP      1195588      10/2002

* cited by examiner

*Primary Examiner*—Randy W. Gibson
(74) *Attorney, Agent, or Firm*—Standley Law Group LLP (57) ABSTRACT

A weighing cell module with a force-transfer mechanism that includes a parallel-guiding linkage with a vertically movable parallelogram leg and a spatially fixed parallelogram leg, is equipped with a mounting area for a first weighing-pan support device with a single-point connection of a weighing pan, as well as with a mounting area for a second weighing-pan support device with a multiple-point connection, particularly a four-point connection, of a weighing pan, wherein the first and the second mounting area are each connected to the force-transfer mechanism. As a result, the weighing cell module can be used to manufacture different types of balances in a design family of balances, where each different type within the family is designed for a different maximum load.

31 Claims, 6 Drawing Sheets

SCALE PAN MOUNT FOR SINGLE-POINT OR MULTI-POINT MOUNTED SCALE PAN

BACKGROUND OF THE INVENTION

The invention relates to a weighing cell, more specifically a weighing cell module with a force-transfer mechanism that includes a parallel-guiding linkage with a vertically movable parallelogram leg and a spatially fixed parallelogram leg.

In a weighing cell as the core element of a balance, the force-transfer mechanism—based on its design for a given maximum load and based on the accuracy that it is capable of achieving—essentially determines the range of applications that a balance can be used for.

Commercially available balances are often structured in so-called families or series of balance models, where the balances within a model family have a similar appearance and are identified by similar model designations. A family of balances is often the result of either a single development project or of a group of mutually connected projects.

Balances of the existing state of the art have the problem that within a model family, the respective weighing cells for different maximum loads and different measurement resolutions can differ strongly from each other in regard to their overall design and their subassemblies. Thus, a large number of variations exists among the subassemblies, which leads to high production and inventory costs.

In particular, the different models within a family of balance models also frequently differ in regard to the size of the weighing pan and the way in which the weighing pan is coupled to the weighing cell. According to a known concept that has proven useful for balances of higher load capacities, the weighing pan which in this case normally needs to be of a larger size, or a weighing-pan support if applicable, is coupled at several (in most cases four) points to the load-receiving part of the weighing cell, i.e., the vertically movable parallelogram leg of the force-transfer mechanism, in order to avoid detrimental effects from eccentrically positioned weighing loads. In low-capacity balances on the other hand, which in most cases have a small weighing pan, the preferred arrangement is to couple the weighing pan to the load-receiving part through a so-called single-point connection, for example through a conical support serving as a seat for the weighing pan.

The known state of the art includes balances in which individual components are already configured in a way that allows them to be adapted to different maximum loads in a relatively economical way.

For example, a balance that is disclosed in EP 0 573 806 A1 has a measuring cell that is connected to a U-shaped intermediate support frame through a form-fitting and force-transmitting connection. The measuring cell is arranged between the U-legs of the intermediate support frame and fastened to the base section of the U-frame. The respective contact surfaces on the intermediate support frame and on the measuring cell are finished within very narrow tolerances, so that no assembly stresses are introduced into the measuring cell when the support frame and the measuring cell are bolted together. Thus, the measuring cell can be adjusted together with the intermediate support frame prior to installation in a balance housing, and the measuring cell and support frame can be installed into a housing as a unit. The U-shaped intermediate support frame is designed to receive measuring cells of different widths.

An overload-protection system for a precision balance described in DE 295 14 793 U1 has a secondary parallel-guiding linkage with upper and lower guide arms, where the ends of the arms that face towards the weighing pan are joined to a connecting leg and the ends that face away from the weighing pan are joined to the load receiver, so that the guide arms, the connecting leg, and the load receiver are tied together in the manner of a parallelogram linkage. The overload protection system includes at least one pre-tensioned spring that keeps the weighing pan and the load receiver rigidly coupled to each other within the weighing range of the balance. The spring is positioned between the upper guide arm and a seating plate that is rigidly connected to the load receiver. The connecting leg passes with lateral clearance through the seating plate. With this design concept it is possible to arrange the overload protection system primarily in a lateral position at the front end of the measuring cell so that it takes up little space.

In addition, a receiving device for a calibration weight can be fastened to or integrated in the guide plates that contain the flexure pivots and are connected by two guide bolts, or it can be fastened to or integrated in the seating plate of the secondary parallel-guiding linkage. Thus, the overload protection system can be preassembled outside the balance and adjusted to the maximum load capacity of the balance. This subassembly is connected to the measuring cell through a small number of screws. The device can be adapted to different load ranges by using a spring with a different spring constant.

However, although the devices disclosed in the prior art are designed to use some of the same individual components in more than one balance model, there is still a relatively large diversity in respect to the overall number of subassemblies. Particularly if balances have to be equipped with weighing pans of different sizes, e.g., small or intermediate-sized or large weighing pans, it is necessary to make accommodations in the design for a stable coupling of the differently sized pans to the weighing cell. Thus, weighing pans exceeding a certain size can no longer be held by means of a cone with a single-point connection to the weighing pan, because the effects of an eccentric position of the weighing load could have too large an influence on the weighing result. An overload device, too, has to meet different requirements depending on the size of the weighing pan. The influence of laterally directed torques which can have an effect on the force-transfer mechanism and can ultimately cause its destruction increases with larger sizes of weighing pans. The objective is to intercept these laterally directed torques.

SUMMARY

Consequently, the task set for the present invention is to harmonize the designs of the components of a balance in such a way that a large diversity of different types of balances within one family of balance models can be made with as few different subassemblies as possible.

The solution to this task is provided through an arrangement with the characterizing features of claim 1. A weighing cell module with a force-transfer mechanism that includes a parallel-guiding linkage with a vertically movable parallelogram leg and a spatially fixed parallelogram leg has a mounting area for a first weighing-pan support device with a single-point connection to the weighing pan as well as a mounting area for a second weighing-pan support device with a multiple-point connection, in particular a four-point connection, to the weighing pan, wherein each of the respective mounting areas for the first and second weighing-pan supports is connected to the force-transfer mechanism. With this design concept, the weighing cell module can be used to manufacture different types of balances in a model family, wherein the different types are designed primarily for different maximum load capacities.

In a family of balance models in which the different types are often distinguished from each other by the size of the weighing pan and by the way in which the weighing pan is coupled to the weighing cell, in particular whether the weighing pan is coupled to the vertically movable parallelogram leg of the force-transfer mechanism at several (in most cases four) points or at a single point, e.g., through a conical support post, the weighing cell module according to the invention makes it possible to connect either type of weighing pan and thus offers a high degree of flexibility. Consequently, a large diversity of different models can be produced within a single design family of balances, while at the same time the number of subassemblies or assembly modules is kept low.

A weighing cell module designed according to the invention is preferably preassembled and adjusted outside of the balance, so that weighing cell modules of a given type become interchangeable for a specified balance model. The concept of a separately adjustable weighing cell module is of particular advantage in service situations, for example if the weighing cell module has to be exchanged outside of the manufacturing facility.

In a particular embodiment of a weighing cell module, the mounting area for the first weighing-pan support device with a single-point connection of the weighing pan as well as the mounting area for the second weighing-pan support device with a multiple-point connection, in particular a four-point connection, of the weighing pan are connected to the force-transfer mechanism by means of an intermediate part. Preferably, if the weighing cell module has an overload protection device, the intermediate part is a component of the overload protection device.

In a particularly preferred configuration, the overload protection device has a secondary parallel-guiding linkage with upper and lower guide arms, wherein one end of each guide arm is connected to the vertically movable parallelogram leg of the force-transfer mechanism and the opposite end is connected to at least one connecting member, so that the guide arms, the connecting member, and the vertically movable parallelogram leg of the force-transfer mechanism are tied together in the manner of a parallelogram linkage. The respective mounting areas for the first weighing-pan support device as well as for the second weighing-pan support device are arranged on the connecting member of the secondary parallel-guiding linkage.

In a particularly advantageous embodiment, the overload protection device includes a pre-tensioned spring that keeps the weighing pan and the vertically movable parallelogram leg rigidly coupled to each other as long as the load on the balance is within the load range. Specifically, the pre-tensioned spring is a helix spring that is adapted to the maximum load specified for the weighing cell module.

In a preferred further developed embodiment of the weighing cell module, the overload protection device includes first and second displacement-limiting stop means that are spatially separated from each other. The second displacement-limiting stop means are configured in such a way that when a weighing cell module is used for the multiple-point connection of the weighing pan, the second displacement-limiting stop means become effective in addition to the first displacement-limiting stop means.

Another embodiment has a chassis body through which the stationary parallelogram leg of the force-transfer mechanism can be rigidly connected to a housing. The chassis body, which is of a particular configuration with a U-shaped profile, is designed to accommodate force-transfer mechanisms of different sizes which are specified for different maximum loads. Furthermore, the displacement-limiting stop means of the overload protection device include at least one displacement-limiting stop arranged on the chassis body.

With this design concept, the weighing cell module is intrinsically protected, i.e., the protection does not depend on displacement-limiting overload-protection stops of the kind that are attached to a housing, in which case a special adaptation of the housing to the weighing cell module would be required, as the clearance gaps of the displacement-limiting stops have to be set with the most exacting precision.

The mounting area for the second weighing-pan support device with several (specifically four) connecting points to a weighing pan is arranged either laterally on both sides of the force-transfer mechanism, or at the intermediate part (if the design includes an intermediate part), in particular at the secondary parallelogram mechanism of the overload protection device. The mounting area for the second weighing-pan support device has ribbed surface portions, and the second weighing-pan support has two support beams, each of which likewise has a ribbed surface portion. Through the mutual engagement of the respective ribbed surface portions the support beams can be attached in a form-fitting and force-transmitting connection to the mounting area.

If even larger weighing pans are used with an arrangement of multiple support points, the two support beams can be joined by transverse connectors to form a frame on which the support points for the weighing pan are located. It should be mentioned at this point that the points of attachment of a weighing pan to a balance should be paced as close as possible to the border of the weighing pan in order to minimize the harmful effects of eccentrically positioned loads.

In a particularly preferred embodiment of a weighing cell module, the second displacement-limiting stop means include a displacement-limiting bolt which can be attached to the support beam or to the frame and which, in the assembled condition of the weighing cell module, is located between an upper second displacement-limiting stop and a lower second displacement-limiting stop, which are both arranged on the chassis body.

The weighing cell module according to the invention not only minimizes the number of different subassemblies for the connection of the weighing pan and for the overload protection device but is also designed with the aim of reducing further components of the balance, for example the calibration system, to a small number of variable elements in each subassembly.

The latter objective is attained in the case of the calibration system through an arrangement with a calibration device that includes a calibration weight receiver, a calibration weight, and a weight-handling device to apply and remove the calibration weight, wherein the calibration weight receiver is connected to the force-transfer mechanism and the calibration weight-handling device is connected to the chassis body. This configuration of the calibration weight-handling device—i.e., the mechanical and electrical components required to lower the weight onto the calibration weight receiver for the calibration measurement and to subsequently raise the calibration weight again—deviates from state-of-the-art arrangements as disclosed, e.g., in EP 0 955 530 A1, where the calibration weight-handling device is connected exclusively to the housing.

To produce a balance that is suitable for the measurement of larger loads, the only modification to be made in the weighing cell module with regard to the calibration device consists of adapting the calibration weight to the maximum load specified for the weighing cell module.

In a specific embodiment of the weighing cell module, the parallel-guiding linkage of the force-transfer mechanism is made as a single piece from a monolithic block of material. In an alternative design, the entire force-transfer mechanism is made monolithically of a single block of material. The force-transfer mechanism operates in particular according to the principle of electromagnetic force compensation.

The weighing cell module forms an independent unit which can be completed or expanded in different ways in order to generate a model family of balances in which the number of subassemblies is kept small, but which nevertheless offers the diversity required by the user for example in regard to maximum load, resolution, calibration capabilities, and size of the weighing pan.

Beyond the force-transfer mechanism itself, it is a preferred concept that specifically those parts or subassemblies with a high manufacturing cost in a weighing cell module according to the invention can be used for all of the individual models in a design family of balances, for example the secondary parallel-guiding linkage of the overload-protection device, the calibration weight-handling device, the chassis body, as well as the weighing pan support devices.

BRIEF DESCRIPTION OF THE DRAWINGS

In the following, the invention is further described through examples that are illustrated schematically in the drawings, wherein:

FIG. 5 shows a partially disassembled weighing cell module in a three-dimensional representation, wherein the weighing cell module of FIG. 1 has been expanded with a frame and thereby configured for a four-point connection of a large weighing pan; with FIG. 5*a* representing a view directed at an oblique angle from above and FIG. 5*b* representing a view directed at an oblique angle from below;

DETAILED DESCRIPTION

Figure 1:
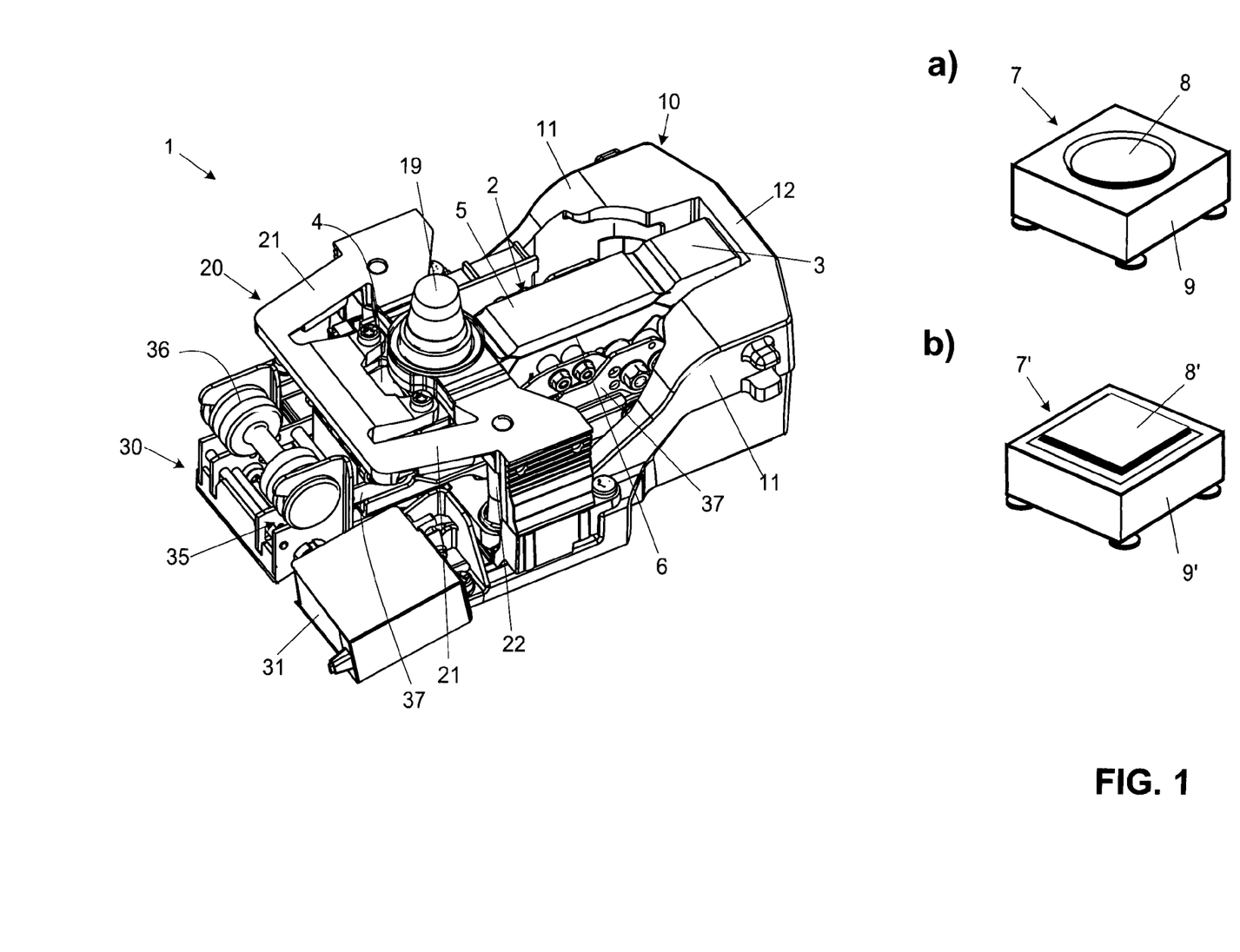
FIG. 1 illustrates a weighing cell module equipped with a support device for a single-point connection of a small weighing pan, in a three-dimensional representation.

FIG. 1 gives a perspective view of parts of a weighing cell that are assembled to form a module which in the following will be referred to as weighing cell module and identified by the reference symbol 1. The preferred working principle for the weighing cell module 1 is electromagnetic force compensation. In addition to electrical and electronic components, the weighing cell module 1 includes a force-transfer mechanism 2 with a parallel-guiding linkage in which a stationary parallelogram leg 3 and a movable parallelogram leg 4 are connected by a pair of guide arms 5 (with only one guide arm 5 being visible in the drawing). The force-transfer mechanism is an integral part of a monolithic material block wherein the essential parts, i.e., the parallelogram, the lever arrangement, the coupling elements and the fulcrum supports (not visible in drawing), are separated from each other by material-free areas in the form of thin linear cuts 6 that traverse the material block in the direction perpendicular to the plane of rotation of the at least one force-reduction lever. A force-transfer mechanism of this kind belongs to the known state of the art and is disclosed in detail in EP 0 518 202 A1. The stationary parallelogram leg 3 of the force-transfer mechanism 2 is connected through a form-fitting and force-transmitting attachment to the base section 12 between the U-legs 11 of a U-shaped chassis body 10. For the purpose of this connection, the connecting contact surfaces on the force-transfer mechanism 2 as well as on the chassis body 10 are finished flat and within narrow tolerances.

A secondary parallel-guiding linkage 20 of an overload protection device is solidly connected to the movable parallelogram leg 4 of the force-transfer mechanism 2. The secondary parallel-guiding linkage 20 is folded back into itself, which means that its guide arms 21 extend first into the space outside of the force-transfer mechanism 2 before splitting into two parts that continue in the reverse direction along the sides of the force-transfer mechanism 2 to locations about laterally adjacent to the movable parallelogram leg 4, where the upper and lower guide arms 21 are connected on each side by a guide bolt 22. This secondary parallelogram linkage 20 can be seen in FIG. 3 and will be discussed in further detail below in the context of FIG. 3.

A calibration weight-handling device 30 is attached directly to the chassis body 10 at the opposite end of the weighing cell module from where the force-transfer mechanism 2 is fastened to the chassis body 10. A calibration weight receiver 35 which holds the calibration weight 36 during the calibration measurement is connected to a lever extension 37 that is attached directly to the force-transfer mechanism 2, particularly to a lever of the force-transfer mechanism 2. A calibration device of this kind belongs to the known state of the art as disclosed in EP 0 955 530 A1. However, the calibration weight-handling device according to this reference is not connected to a chassis body but to the balance housing. The calibration weight-handling device 30 includes an electric motor which is arranged in a motor housing 31 and serves to raise and lower the calibration weight 36 onto the calibration weight receiver 35.

The reduced-scale illustrations a) and b) in the upper right-hand part of FIG. 1 schematically represent balances 7 and 7' that are equipped with a weighing cell module 1 according to the foregoing description. The balance 7 has a round weighing pan 8, and the balance 7' has a rectangular weighing pan 8', both of which are designed for a single-point connection of the weighing pan.

The leg connecting the folded-back ends of the guide arms 21 of the secondary parallel-guiding linkage 20 of the overload protection device carries a cone 19 as a seat for the weighing pan 8, 8'. The weighing pan 8, 8' can be set either directly or in certain cases by means of a weighing pan support (not shown in the drawing) on the cone 19, an arrangement that is referred to as single-point load introduction.

A weighing cell module 1 as illustrated in FIG. 1 and described in the foregoing paragraphs is used with preference in balances for a load range up to about one kilogram, in which case the force-transfer mechanism 2 as well as the calibration weight 36 and the springs of the overload protection device (which will be further described in the context of FIG. 3) are optimized as subassemblies or parts for use in this load range.

Figure 2:
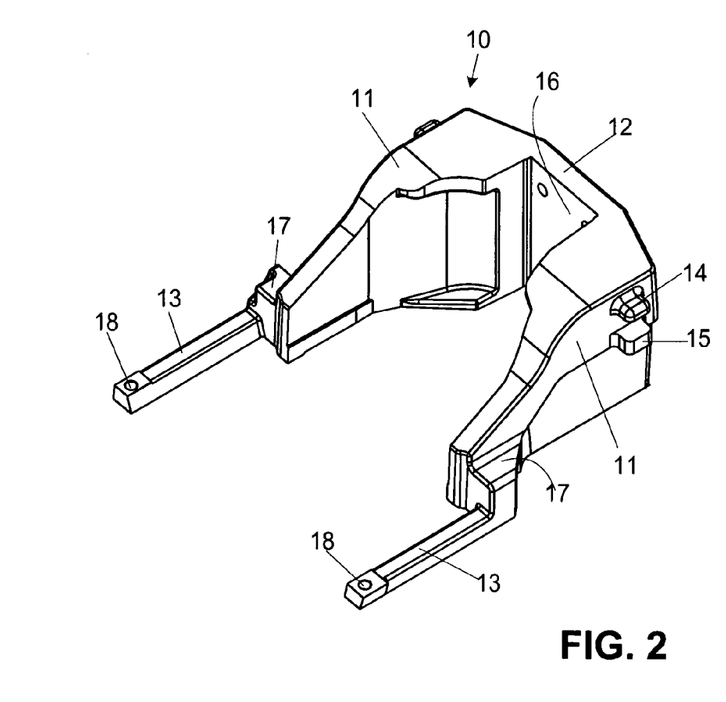
FIG. 2 illustrates a chassis body in a three-dimensional representation.

FIG. 2 illustrates the U-shaped chassis body 10 in a three-dimensional representation. The chassis body 10, which is preferably made as an integrally cast part, consists of a base section 12 and two U-legs 11. At the far end from the base section 12, the U-legs 11 continue into outwardly offset extensions 13 with tapped holes 18 where the calibration weight-handling device 30 (see FIG. 1) can be fastened with screws. The ledge 17 at the other end of the extension 13 functions as a first displacement-limiting stop in conjunction with the overload protection device 20. The mounting surface 16 on the inside of the U-shaped chassis body is finished to narrow tolerances, as mentioned above, to provide a precisely fitting contact with the end surface of the force-transfer mechanism 2, which is likewise finished to correspondingly small tolerances.

The chassis body 10 has tapped holes at its underside (not visible in the drawing) which serve to fasten the chassis body 10 to the base plate (likewise invisible) of a balance housing 9, 9' (see reduced-scale illustrations a) and b) in FIG. 1). The reference symbols 14 and 15 identify, respectively, upper and lower displacement-limiting stops for the overload protection device which will be explained in more detail below in the context of FIGS. 5a and 5b.

Figure 3:
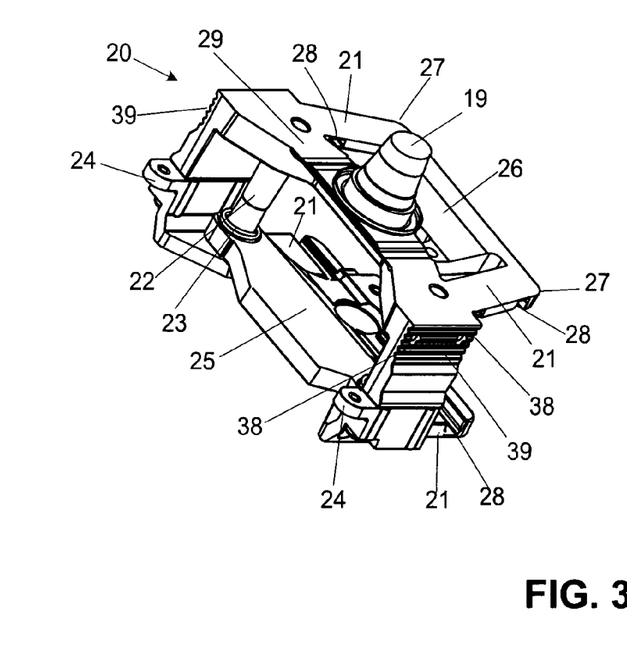
FIG. 3 illustrates a secondary parallel-guiding linkage of an overload protection mechanism in the form of a secondary parallelogram, shown in a three-dimensional representation.

FIG. 3 illustrates, likewise in a perspective view, a secondary parallel-guiding linkage 20 of the overload protection device. An upper and lower guide arm, both identified by reference symbols 21, have respective fastening areas 26 through which the secondary parallel-guiding linkage 20 can be fastened to the top and bottom of the movable parallelogram leg 4 of the force-transfer mechanism, preferably by means of screws. Because of their folded-back configuration, the guide arms 21 have turnaround areas 27 at the far ends from the fastening connection. From the turnaround areas 27, each guide arm is divided into two parts that extend along the outsides of the centrally positioned fastening areas 26. Near the turnaround areas 27, the sections of the guide arms 21 are provided with flexing joints 28. Further flexing joints 28 are located at the transitions from the guide arms 21 to a load-receiving portion 29 of the secondary parallel-guiding linkage 20. In the load-receiving portion 29, the upper and lower guide arms 21 are connected to each other, forming a kind of cage, and they are further in contact with each other through two guide bolts 22 (only one of which is visible) that are arranged inside the cage. A frusto-conical support 19 (also referred to as support cone 19) is installed at the top of the load-receiving portion 29 of the secondary parallel-guiding linkage 21 as a seat for a weighing pan or a weighing-pan support. In case of an overload, the load-receiving portion 29 yields at the flexing joints 28 and moves downward in relation to the fastening areas 26 that are connected to the force-transfer mechanism 2.

Inside the cage, opposite the fastening location of the cone 19, the secondary parallel-guiding linkage has a seating plate 25 which is traversed with contact-free clearance by the two guide bolts 22. The seating plate 25 is rigidly connected to the vertically movable parallelogram leg 4 of the force-transfer mechanism 2. Each of the guide bolts 22 is enveloped by a helix spring 23, which is only symbolically indicated in the drawing. The helix springs 23 are pre-tensioned to bear against the seating plate 25. Under normal operating conditions, the seating plate 25 and the load-receiving portion 29 that forms the cage are pushed into contact with each other, i.e., the secondary parallel-guiding mechanism behaves like a rigid body. However, when an excessive load is applied to the load-receiving portion 29, the latter is deflected downward in relation to the seating plate 25, compressing the two springs 23 and coming to rest on the ledges 17 of the chassis body 10 (see FIG. 2). Each of the two lugs 24 with openings serves to hold a displacement-limiting bolt (see FIGS. 5a and 5b).

The outward-facing surfaces 39 on both sides of the load-receiving portion 29 are ribbed and provided with two tapped holes 38. This feature is provided for the attachment of parts that serve to expand the weighing cell module 1 for use in a higher load range, which will be explained below in further detail.

Figure 4:
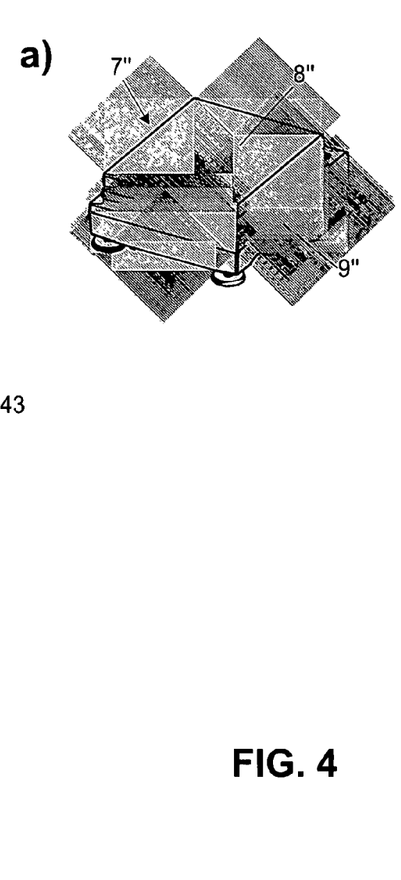
FIG. 4 illustrates a weighing cell module with added support beams for a four-point connection of an intermediate-sized weighing pan, in a three-dimensional representation.

FIG. 4 illustrates the weighing cell module 1 with an adaptation for an intermediate-sized, preferably rectangular weighing pan 8" supported at four points, with a reduced-scale view a) showing the overall configuration of a balance 7" with the weighing pan 8". The adaptation consisted only of removing the support cone 19 and adding a support beam 40 on each side of the secondary parallel-guiding linkage 20. The topsides of the support beams 40 each carry a tub 41 that serves to catch water which may drip into the balance, especially when the balance is placed in an environment of high humidity. Support bolts 42 for the weighing pan are arranged on the support beams 40, standing out at both ends of each tub 41, with fastening nuts 43 on the support bolts 42 holding the tubs 41 in place on the support beams 40.

Accordingly, the secondary parallel-guiding linkage 20 of the overload protection device serves as an intermediate part in the connection of a weighing pan to the vertically movable parallelogram leg 4 of the force-transfer mechanism 2, regardless of whether the load is applied through a single-point connection of the weighing pan by means of the support cone 19 or a four-point connection by means of the support beams 40 and the support bolts 42.

FIG. 4 shows the mounting area 32 for the support cone 19 which has been removed here, as well as the tapped hole 33 where the support cone 19 is fastened to the load-receiving portion 29.

In the process of manufacturing the weighing cell module, only a small number of subassemblies or parts have to be installed additionally or alternatively—for example the force-transfer mechanism—in order to produce a weighing cell module 1 for a balance with an intermediate-sized weighing pan 8" with four-point connection instead of a weighing cell module 1 for a balance with a small weighing pan 8, 8' with single-point connection. Since intermediate-sized weighing pans 8" are normally used in balances 7" that are designed for a higher load range, a weighing cell module 1 with an intermediate-sized weighing pan 8" is preferably equipped with a force-transfer mechanism 2 that is designed for commensurately higher loads, further with an overload protection device 20 that becomes effective at higher overloads (which only requires a pair of helix springs with a stiffer spring constant), and also with a larger calibration weight 36'. All other subassemblies of the weighing cell module 1, i.e., the chassis body 10, the secondary parallel-guiding linkage 20, and the calibration weight-handling device 30 are the same as for a weighing cell module 1 that is used for balances 7, 7' in the low-capacity load range.

Figure 5A:
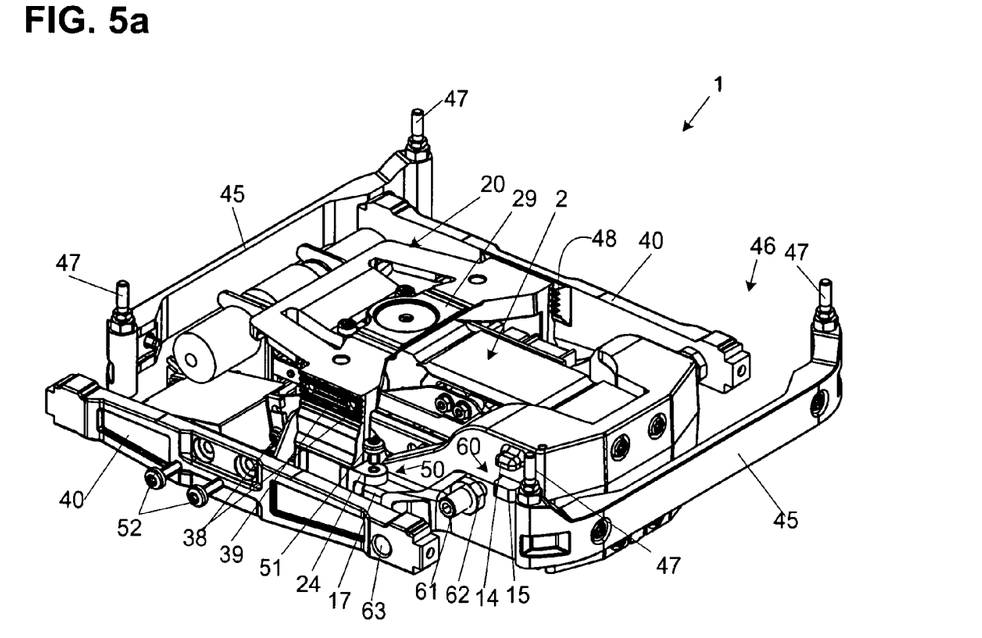
Figure 5B:
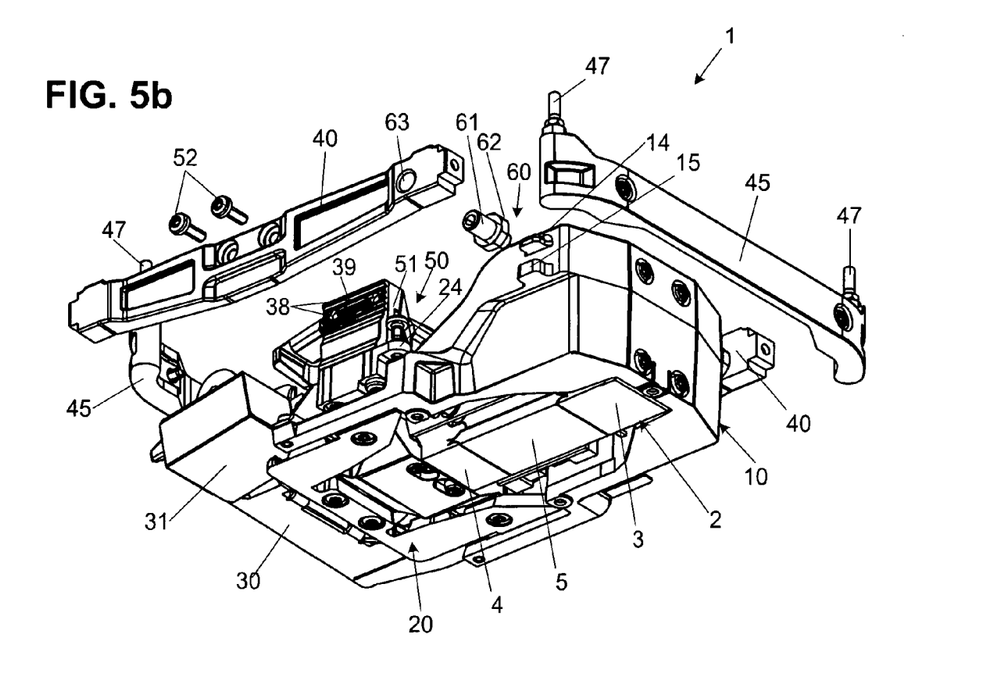

FIGS. 5a and 5b show a perspective view of a weighing cell module 1 that is partially taken apart, with FIG. 5a representing a view directed at an oblique angle from above and FIG. 5b representing a view directed at an oblique angle from below. While the tubs 41 of FIG. 4 have been omitted, FIGS. 5a and 5b illustrate the same weighing cell module 1 as in FIG. 4 with the addition of transverse connectors 45 which, in conjunction with the support beams 40, form a frame 46. A frame 46 of this kind, which is formed by bolting the transverse connectors 45 to the support beams 40 and which contains four support bolts 47 attached to the ends of the transverse connectors 45, can again be used for a four-point support of a large weighing pan, i.e., a weighing pan with a larger load-receiving surface than the weighing pan of the expanded weighing cell module of FIG. 4.

As can further be seen in FIG. 5a, the support beams 40 have a connecting area 48 with a ribbed surface analogous to the ribbed structure of the outward-facing surface 39 of the load-receiving portion 29 of the secondary parallel-guiding linkage 20, so that a form-fitting and force-transmitting connection is formed by the mutual engagement of the two ribbed structures, whereby the support beams 40 are joined without play to the overload protection device 20. The support beams 40 can thus be held in a defined, unchangeable position by means of the screws 52 that are turned tightly into the tapped holes 38.

FIG. 5a as well as FIG. 5b show first displacement-limiting stop means 50 and second displacement-limiting stop means 60 of the overload protection device 20. The first displacement-limiting stop means 50 are constituted by a screw 51 which is turned into the hole of the lug 24 where it is secured in a stable position and by the ledge 17 which stops the screw 51 in the case of an overload, i.e., if the secondary parallel-guiding linkage is deflected downward in relation to the movable parallelogram leg 4 of the force-transmitting device 2. The first displacement-limiting stop means 50 are provided for a weighing cell module 1 independent of whether it is used in balances with a small, intermediate or large weighing pan. The first displacement-limiting stop means 50 serve primarily to absorb overloads that are directed vertically downward at the force-transfer mechanism 2.

The second displacement-limiting stop means 60 are provided only for the use of a weighing cell module 1 in balances with intermediate or large-sized weighing pans. The second displacement-limiting stop means 60 include bolts 61 with fastening nuts 62 which are installed in the tapped holes 63 in both of the support beams 40. In the assembled condition, the protruding end of the bolt 61 is positioned between the upper second displacement-limiting stop 14 and the lower second displacement-limiting stop 15 and becomes effective in the case of upward-directed as well as downward-directed overloads. The second displacement-limiting stop means act in particular as a safety device against torques caused by eccentrically introduced forces, in particular torques that tend to force the weighing pan into a tilted position.

As a result, an overload device 20 has been provided with displacement-limiting stop means 50, 60 which in the case of overloads become effective in a hierarchical sequence.

The first and second displacement-limiting stop means 50, 60 are adjustable in regard to how large a deflection they will allow in the secondary parallel-guiding linkage in case of an overload. This adjustment is performed for the first displacement-limiting stop means 50 by turning the screw 51 to set its distance from the ledge 17 and in the case of the second displacement-limiting stop means 60 by turning the bolt 61 which is designed as an eccentric so that the respective gaps from the eccentric bolt 61 to the upper and lower second displacement-limiting stops 14 and 15 can be made larger or smaller depending on the position in which the bolt 61 is locked tight in the tapped hole 63. As a rule, this process of setting the overload protection device 20 is performed only once, i.e., in the course of adjusting the weighing cell module 1 prior to its installation in a balance housing 9, 9', 9", 9', As an additional benefit, by deviating from the state of the art in the configuration of the displacement-limiting stop means 50, 60, i.e., by integrating them in the weighing cell module 1 rather than attaching them to the housing, the tolerances of the clearance gaps in the displacement-limiting stop means can be controlled better, so that the reproducibility of the displacement-limiting effect is improved.

Figure 6:
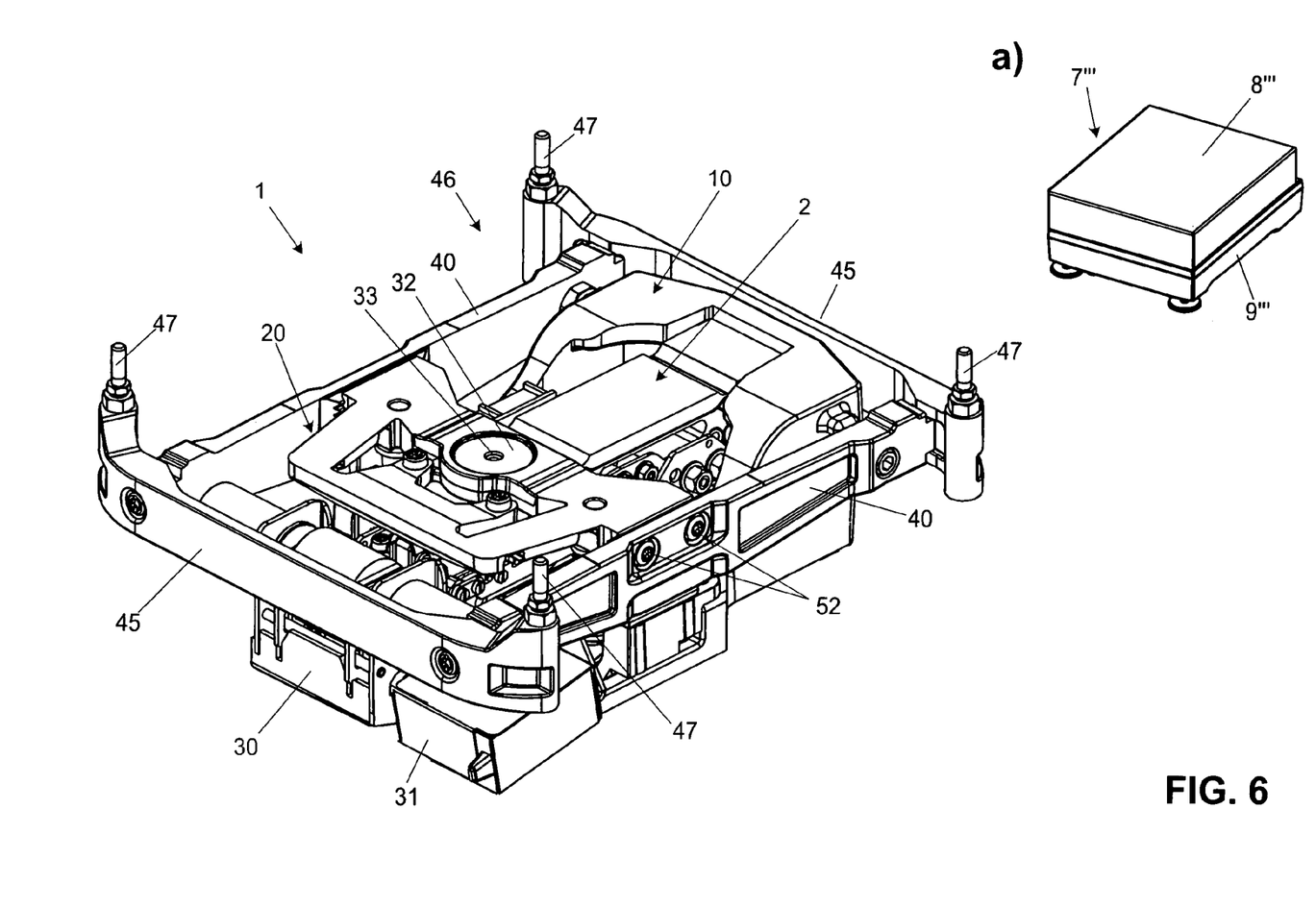
FIG. 6 shows the weighing cell module of FIG. 5 in the assembled state, in a perspective representation.

FIG. 6 shows the weighing cell module of FIGS. 5a and 5b in the assembled state, viewed from above at an oblique angle. This representation shows clearly how the support beams 40 and the transverse connectors 45 are joined together to form the frame 46. The support bolts 47 are arranged to support a large rectangular weighing pan 8' as closely to the corners as possible. The reduced-scale drawing a) in FIG. 6 represents a corresponding balance 7' with a large rectangular weighing pan 8' and a housing 9'.

A weighing cell module 1 according to FIG. 6 is adjusted in the same manner as the weighing cell modules shown in FIGS. 1 and 4, i.e., the adjustment takes place outside the balance, and the weighing cell is installed as a completed assembly module in a balance 7'. The adjustments of the weighing cell module outside of the balance include in particular a temperature-compensation adjustment, so that the weighing data and weighing parameters of a balance that has been equipped with a weighing module 1 according to the foregoing description are largely unaffected by temperature effects.

The invention has been described through an example of a weighing cell module with a U-shaped chassis body. However, based on what the invention teaches it is also conceivable to use other shapes for the chassis body, for example a connecting plate or a connecting base, to mount the force-transfer mechanism in a housing. As a principle, the additional subassemblies of the weighing cell module, such as for example a calibration weight-handling device or an overload protection device, are attached either to the force-transfer mechanism or to the chassis body. It is self-evident that other calibration weight arrangements or other embodiments of an overload protection device that are suitable for integration in a weighing cell module according to the foregoing description are also encompassed by the inventive concept. In particular, the force-transfer mechanism is not meant to be limited exclusively to devices based on the principle of electromagnetic force compensation. Within the realm of the invention it is also conceivable to use a force-transfer mechanism in which strain gauges are used as sensors, as well as other force-transfer mechanisms that are not specified in detail herein.

Figure 7:
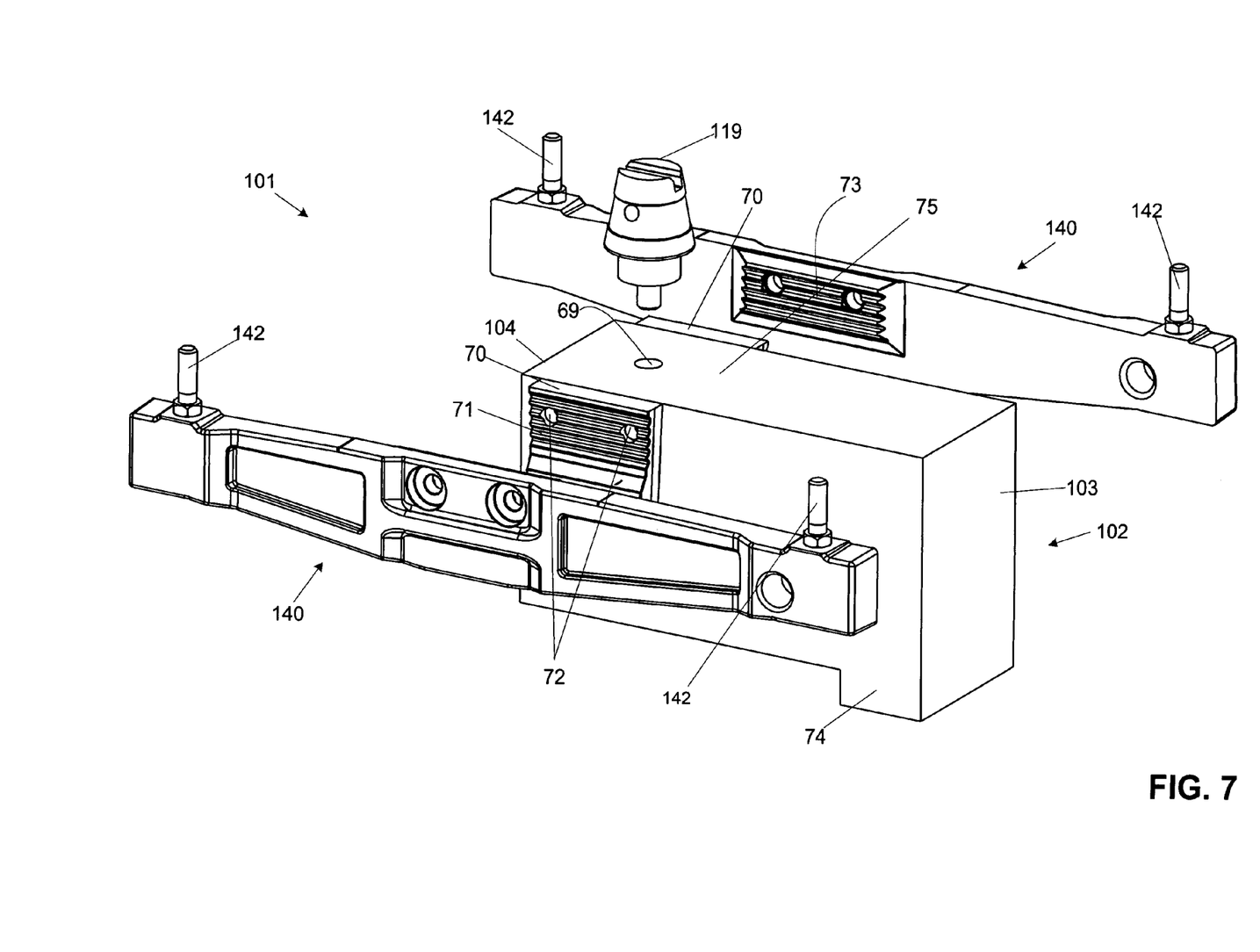
FIG. 7 illustrates a weighing cell module according to a further embodiment which is expanded with support beams that can be fastened directly to the force-transfer mechanism, shown taken apart in a schematic representation.

FIG. 7 demonstrates in a strongly generalized schematic view that there is no absolute need for a weighing cell module to be equipped with an overload protection device or a calibration device. A weighing cell module of this kind is used for example in a simple balance with relatively modest accuracy requirements. This configuration of a weighing cell module 101 offers the choice that either a support cone 119 for a single-point connection of the weighing pan or two support beams 140 with support bolts 142 can be fastened directly to the force-transfer mechanism 102. In the embodiment of FIG. 7, a tapped hole 69 for anchoring the support cone 119 is arranged in the top surface 75 of the vertically movable parallelogram leg 104, and a fastening area 70 with a ribbed outward-facing surface 71 and two tapped holes 72 for the attachment of a support beam 140 is provided on each side of the movable parallelogram leg 104. The support beams 140 are likewise provided with a ribbed surface area 73 on the side that faces the force-transfer mechanism. The stationary parallelogram leg 103 of the force-transfer mechanism 102 is extended at the bottom into a stepped-off fastening portion 74 that serves to install the force-transfer mechanism 102 in a balance housing or on the base plate of a balance housing.

LIST OF REFERENCE SYMBOLS 1, 101 weighing cell module
2, 102 force-transfer mechanism
3, 103 stationary parallelogram leg
4, 104 vertically movable parallelogram leg
5 guide arm of parallelogram linkage
6 thin linear cuts
7, 7', 7", 7' balance
8, 8', 8", 8' weighing pan
9, 9', 9", 9' balance housing
10 U-shaped chassis body
11 U-leg
12 base section of 10
13 extension of U-leg
14 upper second displacement-limiting stop
15 lower second displacement-limiting stop
16 mounting surface
17 ledge of first displacement-limiting stop
18 tapped holes
19, 119 support cone
20 secondary parallel-guiding linkage
21 guide arm of secondary parallel-guiding linkage
22 guide bolt
23 spring, helix spring
24 lug
25 seating plate
26 fastening area
27 turnaround area
28 flexing joint
29 load-receiving portion
30 calibration weight-handling device
31 motor housing
32 mounting area for support cone
33 tapped hole
35 calibration weight receiver
36, 36' calibration weight
37 lever extension
38 tapped hole
39 outward-facing surface
40, 140 support beam
41 tub
42, 142 support bolt
43 fastening nut
45 transverse connector
46 frame
47 support bolt
48 connecting area
50 first displacement-limiting stop means
51 screw
52 screw
60 second displacement-limiting stop means
61 bolt
62 fastening nut
63 tapped hole
69 tapped hole
70 fastening area
71 ribbed outward-facing surface
72 tapped holes
73 ribbed surface area
74 stepped-off fastening portion
75 top surface of vertically movable parallelogram leg 104

We claim:

1. A weighing cell module with a force-transfer mechanism that includes a parallel-guiding linkage with a vertically movable parallelogram leg and a spatially fixed parallelogram leg comprising:
a mounting area for a first weighing-pan support device with a single-point connection for a weighing pan is connected to said force-transfer mechanism; and
a mounting area for a second weighing-pan support device with a multiple-point connection for a weighing pan is connected to said force-transfer mechanism such that the weighing cell module can be used to manufacture different types of balances in a design family of balances.

2. The weighing cell module according to claim 1 wherein said mounting area for said first weighing-pan support device with the single-point connection for a weighing pan and said mounting area for the second weighing-pan support device with the multiple-point connection for a weighing pan are joined to said force-transfer mechanism by an intermediate part.

3. The weighing cell module according to claim 2 additionally comprises an overload protection device, wherein said intermediate part is a component of said overload protection device.

4. The weighing cell module according to claim 3 wherein said overload protection device comprises a secondary parallelogram linkage with an upper and a lower guide arm, wherein one end of each said guide arm is connected to said vertically movable parallelogram leg of said force-transfer mechanism and a respectively opposite end of each said guide arm is connected to at least one connecting member, such that said guide arms, said at least one connecting member and said vertically movable parallelogram leg form said secondary parallelogram linkage, and wherein said mounting area for said first weighing-pan support device and said mounting area for the second weighing-pan support device are arranged on at least one said connecting member of said secondary parallel-guiding linkage.

5. The weighing cell module according to claim 4, wherein said overload protection device comprises a pretensioned spring which is adapted to a specified maximum load of the force-transfer device and keeps the at least one connecting member of the secondary parallel-guiding linkage rigidly coupled to the vertically movable parallelogram leg within a specified load range.

6. The weighing cell module according to claim 3, wherein said overload protection device comprises a first displacement-limiting stop means and, spatially separated from the latter, a second displacement-limiting stop means, wherein said second displacement-limiting stop means are configured in such a way that in a weighing cell module that is used for a multiple-point connection with the weighing pan, said second displacement-limiting stop means becomes effective in addition to said first displacement-limiting stop means.

7. The weighing cell module according to claim 1 additionally comprising a chassis body through which said spatially fixed parallelogram leg of said force-transfer mechanism can be rigidly connected to a housing.

8. The weighing cell module according to claim 7, wherein said chassis body is designed to accommodate force-transfer mechanisms of different sizes which are specified for different maximum loads.

9. The weighing cell module according to claim 7, wherein said displacement limiting stop means of said overload protection device comprises at least one displacement-limiting stop arranged on said chassis body.

10. The weighing cell module according to claim 1, wherein said mounting area for said second weighing-pan support device has ribbed surface portions arranged on both sides of said force-transfer mechanism and said second weighing-pan support device has two support beams, each having a ribbed surface portion, wherein a form-fitting connection can be established through a mutual engagement of the respective ribbed surface portions of a said support beam and said mounting area.

11. The weighing cell module according to claim 1, wherein said mounting area for said second weighing-pan support device has ribbed surface portions arranged on said intermediate part and said second weighing-pan support device has two support beams, each having a ribbed surface portion, wherein a form-fitting connection can be established through a mutual engagement of the respective ribbed surface portions of a said support beam and said mounting area.

12. The weighing cell module according to claim 1, wherein said mounting area for said second weighing-pan support device has ribbed surface portions arranged on both sides of said force-transfer mechanism and said second weighing-pan support device has a frame, wherein a form-fitting connection can be established through a mutual engagement of the respective ribbed surface portions of said frame and said mounting area.

13. The weighing cell module according to claim 1, wherein said mounting area for said second weighing-pan support device has ribbed surface portions arranged on said intermediate part and said second weighing-pan support device has a frame, wherein a form-fitting connection can be established through a mutual engagement of the respective ribbed surface portions of said frame and said mounting area.

14. The weighing cell module according to claim 12, wherein said frame is formed by adding transverse connectors to the support beams.

15. The weighing cell module according to claim 13, wherein said frame is formed by adding transverse connectors to the support beams.

16. The weighing cell module according to claim 10, additionally comprising a first displacement-limiting means, a second displacement-limiting means and a chassis body, wherein said second displacement-limiting stop means include a displacement-limiting bolt attached to one of the following structures: a said support beam and a frame of said second weighing pan support device, wherein said displacement-limiting bolt is arranged between an upper second displacement-limiting stop and a lower second displacement-limiting stop which are both arranged on said chassis body.

17. The weighing cell module according to claim 11, additionally comprising a first displacement-limiting means, a second displacement-limiting means and a chassis body, wherein said second displacement-limiting stop means include a displacement-limiting bolt attached to one of the following structures: a said support beam and a frame of said second weighing pan support device, wherein said displacement-limiting bolt is arranged between an upper second displacement-limiting stop and a lower second displacement-limiting stop which are both arranged on said chassis body.

18. The weighing cell module according to claim 12, additionally comprising a first displacement-limiting means, a second displacement-limiting means and a chassis body, wherein said second displacement-limiting stop means include a displacement-limiting bolt attached to one of the following structures: a support beam of said second weighing-pan support device and said frame of said second weighing pan support device, wherein said displacement-limiting bolt is arranged between an upper second displacement-limiting stop and a lower second displacement-limiting stop which are both arranged on said chassis body.

19. The weighing cell module according to claim 13, additionally comprising a first displacement-limiting means, a second displacement-limiting means and a chassis body, wherein said second displacement-limiting stop means include a displacement-limiting bolt attached to one of the following structures: a support beam of said second weighing-pan support device and said frame of said second weighing pan support device, wherein said displacement-limiting bolt is arranged between an upper second displacement-limiting stop and a lower second displacement-limiting stop which are both arranged on said chassis body.

20. The weighing cell module according to claim 7, wherein a calibration device is provided which comprises a calibration weight receiver, a weight-handling device to apply and remove a calibration weight, and a calibration weight, wherein said calibration weight receiver is connected to said force-transfer mechanism and said calibration weight-handling device is connected to said chassis body.

21. The weighing cell module according to claim 10 additionally comprising a chassis body, wherein a calibration device is provided which comprises a calibration weight receiver, a weight-handling device to apply and remove a calibration weight, and a calibration weight, wherein said calibration weight receiver is connected to said force-transfer mechanism and said calibration weight-handling device is connected to said chassis body.

22. The weighing cell module according to claim 11 additionally comprising a chassis body, wherein a calibration device is provided which comprises a calibration weight receiver, a weight-handling device to apply and remove a calibration weight, and a calibration weight, wherein said calibration weight receiver is connected to said force-transfer mechanism and said calibration weight-handling device is connected to said chassis body.

23. The weighing cell module according to claim 12 additionally comprising a chassis body, wherein a calibration device is provided which comprises a calibration weight receiver, a weight-handling device to apply and remove a calibration weight, and a calibration weight, wherein said calibration weight receiver is connected to said force-transfer mechanism and said calibration weight-handling device is connected to said chassis body.

24. The weighing cell module according to claim 13 additionally comprising a chassis body, wherein a calibration device is provided which comprises a calibration weight receiver, a weight-handling device to apply and remove a calibration weight, and a calibration weight, wherein said calibration weight receiver is connected to said force-transfer mechanism and said calibration weight-handling device is connected to said chassis body.

25. The weighing cell module according to claim 20, wherein said calibration device comprises a calibration weight that is adapted to the maximum load specified for said force-transfer mechanism.

26. The weighing cell module according to claim 21, wherein said calibration device comprises a calibration weight that is adapted to the maximum load specified for said force-transfer mechanism.

27. The weighing cell module according to claim 22, wherein said calibration device comprises a calibration weight that is adapted to the maximum load specified for said force-transfer mechanism.

28. The weighing cell module according to claim 23, wherein said calibration device comprises a calibration weight that is adapted to the maximum load specified for said force-transfer mechanism.

29. The weighing cell module according to claim 24, wherein said calibration device comprises a calibration weight that is adapted to the maximum load specified for said force-transfer mechanism.

30. The weighing cell module according to claim 1, wherein said parallel-guiding linkage of said force-transfer mechanism is made as one single piece from a block of material.

31. The weighing cell module according to claim 1, wherein said force-transfer mechanism is a device that operates according to the principle of electromagnetic force compensation and is made as one single piece from a block of material.

* * * * *